March 29, 1966 E. B. ROMBERG 3,242,745
COMPENSATION DEVICE FOR GYROSCOPE MOTOR AND TORQUER DRIVES
Filed Nov. 30, 1960 2 Sheets-Sheet 1
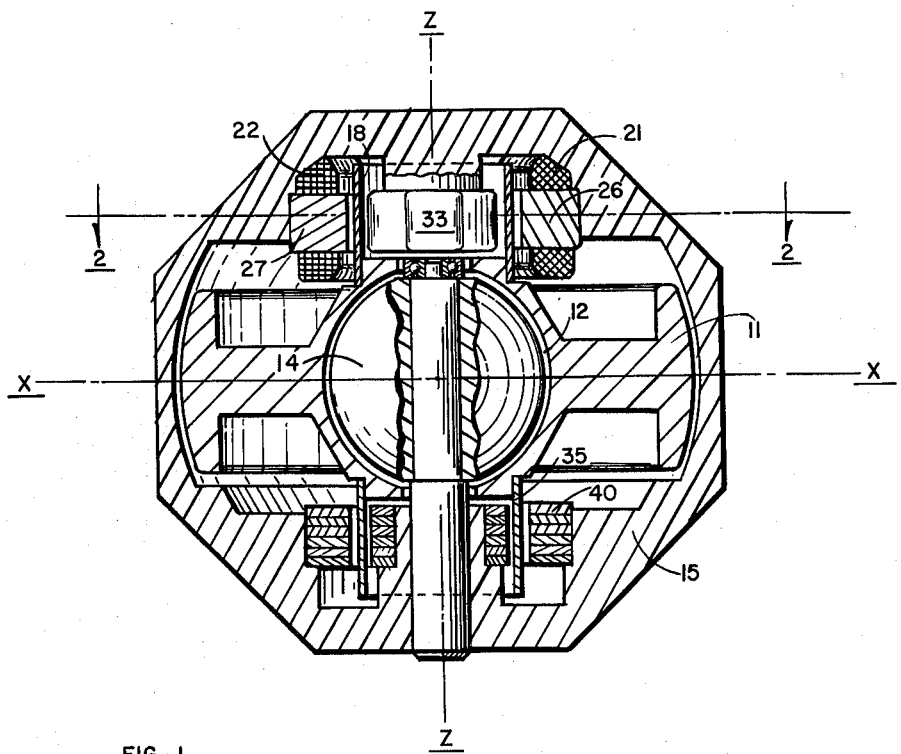
FIG. 1
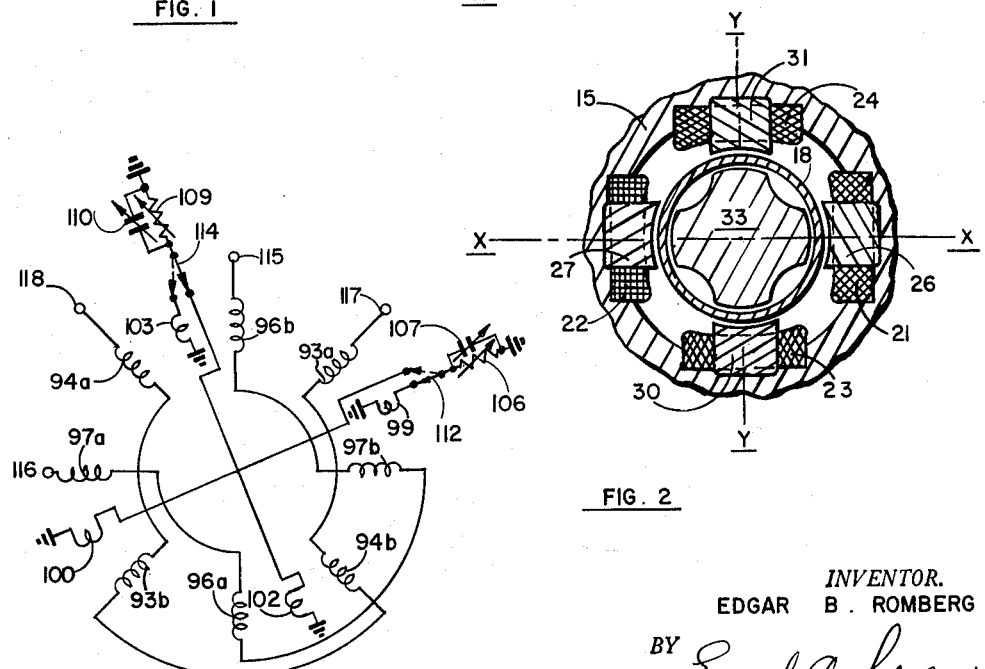
FIG. 5
FIG. 2
*INVENTOR.*
EDGAR B. ROMBERG
BY Edward A. Sokolski
AGENT March 29, 1966     E. B. ROMBERG     3,242,745
COMPENSATION DEVICE FOR GYROSCOPE MOTOR AND TORQUER DRIVES
Filed Nov. 30, 1960     2 Sheets-Sheet 2

*INVENTOR.*
EDGAR B. ROMBERG
BY Edward A. Sokolski
AGENT

United States Patent Office 3,242,745
Patented Mar. 29, 1966

3,242,745
COMPENSATION DEVICE FOR GYROSCOPE
MOTOR AND TORQUER DRIVES
Edgar B. Romberg, Whittier, Calif., assignor to
North American Aviation, Inc.
Filed Nov. 30, 1960, Ser. No. 72,820
12 Claims. (Cl. 74—5.46)

The invention relates to a compensation device for gyroscope torquer and motor drives and more particularly to such a compensation device especially suitable for use in free-rotor gyroscopes.

A free-rotor gyroscope may be defined as one having two axes of freedom in addition to its spin axis. A torquer and motor for such a gyroscope is described in co-pending application Ser. No. 783,644, filed Dec. 19, 1958, now Patent No. 3,025,708, inventors John M. Slater and Joseph C. Boltinghouse, assigned to North American Aviation, Inc. In this application, a motor and a torquer each utilizing a similar conductive shell attached to the gyro rotor are shown operating in conjunction with means for generating electromagnetic fields. Electromagnetic fields are separately generated for both the torquer and motor by at least two separate pairs of oppositely positioned stator windings for each.

The fields generated by these coils produce eddy currents in the conductive shells attached to the rotor, and these eddy currents co-acting with the generated electromagnetic fields produce torques on the shells and the attached rotor. The torque produced in the case of the motor is used to rotate the gyroscope rotor while in the case of the torquer is used to produce a drag on the rotor in accordance with the torquing currents fed through the torquing coils.

Torquing signals are applied to the torquing coils to counteract torques acting on the rotor which would produce an unwanted precession of the gyroscope. Such unwanted torques could, for example, be due to the earth's rate of rotation which varies with latitude or could be influenced by mechanical asymmetries in the construction of the motor. In any event, the effects of such unwanted torques can be effectively eliminated by applying torques equal and opposite thereto to the gyroscope rotor by means of the gyroscope torquer. This operation is thoroughly described in the aforementioned application Ser. No. 783,644.

It is to be noted that the torques acting on the gyroscope rotor due to earth rate effects vary with latitude and the direction of travel and speed of the vehicle in which the gyroscope is carried. It is therefore necessary to feed in a torquing current to the torquing coils which varies as a function of these parameters. This end result is generally accomplished by generating a varying torquing current for the torquing coils in an appropriate torquing current source comprising a computer. Such a computer having information fed thereto as to latitude and direction of travel and speed of the vehicle is capable of programming an output torquing current as a function of these variables.

While the torquer is compensating for undesired torques acting on the rotor, it may in itself, produce additional undesired torques on the gyroscope rotor. Such unwanted torques may be caused, for example, by such factors as misalignment of the torquer axes with the gyro axis, nonsymmetry of the torquer flux gaps, or unequal windings in oppositely positioned torquing coils. Unwanted torques generated in the torquer itself tend to be of three general types: (1) Those causing misalignment of the torquing axis and the gyro axis; (2) those producing an undesirable scale factor; and (3) those producing nonlinearity in the torquer response, i.e., a different scale factor for positive and negative torque inputs. It is to be noted that most of these problems can be minimized by holding the construction and assembly of the torquer to very close tolerances. To maintain the necessary tolerances for the accuracy required in a precision gyroscope, however, greatly increases the cost and difficulty of producing such a gyroscope.

The device of this invention provides means for eliminating these problems in a relatively simple manner. The desired end result is achieved by providing two pairs of compensating coils for each of the undesired torques produced due to inadequacies in the construction and assembly of the torquer. Compensating coils may also be used to correct for misalignments in the gyro motor.

In the case of torquer compensation, a separate pair of compensating coils is mounted adjacent each pair of torquing coils. A portion of the torquing current fed to the main torquing coils is constantly fed from the torquing current source through the compensating coils. In the case of the axis alignment compensation, a portion of the torquing current for the main torquing coils along one axis is fed through compensating coils mounted adjacent the main torquing coils positioned along an axis normal to this one axis.

Means are provided for adjusting the ratio that the current flowing through each pair of compensating coils bears to the current flowing through the associated series connected main torquqing coils. In the case of the scale factor and linearity adjustments, each of the two pairs of compensating coils for each set of adjustments is connected in series with the associated main torquing coils adjacent to which they are positioned.

Motor alignment compensation is achieved by adjusting the current flowing in pairs of compensating coils located adjacent to associated motor stator windings.

It is therefore an object of this invention to provide a simple yet effective means for compensating for irregularities in gyroscope torquers and motors.

It is still a further object of this invention to improve the performance of gyroscope torquers and motors.

It is a still further object of this invention to enable the relaxation of tolerances in the manufacture and assembly of free-rotor gyroscopes without sacrificing precision operation.

It is still a further object of this invention to provide a compensating torquing current which will vary as a fixed proportion of the total torquing current fed to the main torquing coils.

Other objects of this invention will become apparent from the following description taken in connection with the accompanying drawings in which FIG. 1 is a cross-sectional view of a free-rotor gyroscope illustrating the torquer and motor used therewith;

FIG. 2 is a cross-sectional view of the gyroscope of FIG. 1 as taken along a plane represented by the line 2—2 indicated in FIG. 1;

FIG. 5 is a schematic diagram of a compensation scheme for motor alignment.

Figure 3:
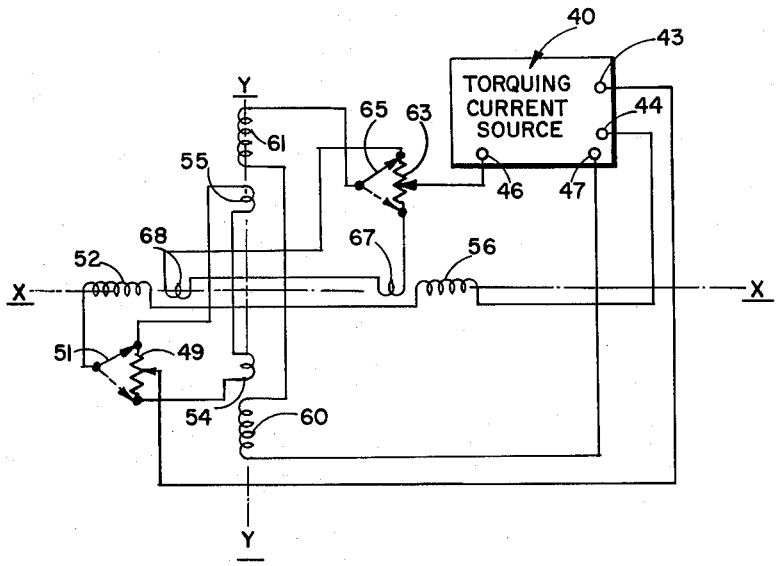
FIG. 3 is a schematic diagram of a torquing compensation scheme for axis alignment.

Referring to FIGS. 1 and 2, a free-rotor gyroscope in which the device of the invention can be utilized is illustrated. The free-rotor gyroscope comprises a rotor 11 which is supported on an air bearing 12 located between the rotor 11 and a ball-shaped member 14 which is fixedly attached to the gyro case 15. The gyro rotor 11 spins about axis Z—Z and has limited freedom of motion about axes X—X and Y—Y normal to each other and to the rotor spin axis.

The gyroscope torquer comprises a highly conductive cylindrical shell 18 which is fixedly attached to the rotor 11 and two pairs of magnetic field windings 21, 22, and 23, 24. Field windings 21 and 22 are wound around magnetic cores 26 and 27, respectively, and are positioned on opposite sides of cylindrical shell 18 along axis X—X. Fields windings 23 and 24 are wound around magnetic cores 30 and 31, respectively, and positioned on opposite sides of cylindrical shell 18 along axis Y—Y. An inner magnetic pole member 33 is fixedly attached to the case 15. This pole member has four integral protruding poles each of which is positioned opposite one of magnetic cores 26, 30, 27, and 31.

A magnetic flux path is thereby provided from each of the magnetic cores through cylindrical shell 18 to inner pole member 33. As the electrically conductive shell 18 moves in the magnetic field produced, eddy currents will be generated in the shell proportional to the magnetic field and the shell's velocity of spin.

By Lenz's law, the eddy currents produced in the shell react with the magnetic fields to produce tangential drag forces opposing the rotation of the rotor. If the drag foces at opposite poles are equal to each other, the only effect on the gyro is the brake action on the spin that must be overcome by the motor located at the opposite end of the gyro. However, if any two opposite drag forces are not equal, a torque will be applied to the rotor. It can be shown that a torque is applied to the rotor about the X axis which is proportional to the difference between the squares of the magnetic field generated by virtue of the current in field coil 21 and the magnetic field generated by virtue of the current in field coil 22. This is proportional to the difference between the squares of the electrical currents flowing in these coils. Similarly, it can be shown that the torque applied to the rotor about the Y axis is proportional to the difference between the squares of the magnetic fields due to the current flowing in field windings 23 and 24.

Each of the field windings 21–24 may include two coils, a bias coil and a main torquing coil. In such a torquer, the bias coils are all connected in series and carry a constant bias current. The main torquing coils are wound so that one of each pair of torquing coils will be aiding its associated bias coil while the other of this pair is bucking the magnetic flux produced by its associated bias coil. It can be shown that in such an arrangement, the field windings will produce a torque on the rotor which is proportional to the first power of the torquing current through the coils rather than the square of this current. This is in view of the fact that the coils are wound so that in one torquing coil this current will produce a flux aiding that produced by the associated bias coil while this same current in the oppositely positioned torquing coil will produce a magnetic flux bucking that produced by the associated bias coil. It can readily be shown that the resulting magnetic unbalance is proportional to four times the current flowing in the bias coils (a constant) times the current flowing in the torquing coils.

Each of the field windings 21–24 includes torquing compensating coils which are the subject matter of the device of the invention. Each compensating coil is wound around an associated magnetic core 26, 27, 30, or 31 in close proximity to an associated bias and main torquing coil.

The eddy current motor comprises a cylindrical shell 35 similar to cylindrical shell 18 and a motor stator 40 which may include coventional poly-phase motor windings (not shown). The motor operates as a conventional eddy current motor. The compensating coils of the device of the invention are positioned about the shell 35 along two axes normal to each other and the motor spin axis. The connection and operation of these compensating coils will be explained further on in the specification.

Referring now to FIG. 3, a schematic diagram is shown of an embodiment of the device of the invention to compensate for misalignment of the torquer axes. A first output from torquing current source 40 is fed from terminal 43 to the arm of potentiometer 49. With switch 51 in the position indicated, current will flow through potentiometer 49 to main torquing coil 52 by two paths. The first of these paths is directly through the upper portion of potentiometer 49 through switch 51 to coil 52. The other of these paths is through the bottom portion of potentiometer 49 through series connected compensating coils 54 and 55 to switch 51 and thence to coil 52. The direction of the torquing current flow through coils 55 and 54 can be reversed by throwing switch 51 to the bottom end of potentiometer 49 as indicated by the dotted line. The total torquing current, i.e., that portion flowing through the top end of potentiometer 49 plus that portion flowing through coils 54 and 55, flows through main torquing coils 52 and 56 (positioned on the X axis) to terminal 44.

The proportion of the total torquing current which flows through coils 54 and 55 can be adjusted by setting the movable arm of potentiometer 49 and, as already noted, the direction in which this portion of the total current flows through coils 54 and 55 is determined by the position to which switch 51 is thrown. Compensating coils 54 and 55 are wound with respect to the bias coils (not shown) associated with main torquing coils 60 and 61, respectively, so that when one tends to aid the flux produced by its associated bias coil along the Y axis the other will tend to buck the flux produced by its associated bias coil and vice versa. Therefore, the currents in the compensating coils 54 and 55 will tend to produce a differential flux which will cause a torque on the cylindrical sleeve 18 (FIGS. 1 and 3) about the Y axis in accordance with the current passing through these compensating coils. Thus, by adjustment of potentiometer 49, a selected portion of the X axis torquer current can be made to flow through coils 54 and 55 for aligning the X axis torquer.

A second torquing current source output is fed from terminal 46 of torquing current source 40 to potentiometer 63. Current is fed through potentiometer 63 by two paths to Y axis main torquing coils 61 and 60 and thence to terminal 47. The two paths comprise compensating coils 67 and 68 mounted on the X axis and the top portion of potentiometer 63. Similarly as for compensating coils 54 and 55, the amount of compensating current flowing through coils 67 and 68 and the direction of this current flow can be adjusted by means of poteniometer 63 and switch 65, respectively. Coils 67 and 68 similarly to coils 54 and 55 are wound so that one produces an aiding flux while the other produces a bucking flux to that produced by the respective bias coil (not shown) associated with main torquing coil 52 or 56 on the X axis. Thus, potentiometer 63 can be adjusted to effectively align the Y axis torquer.

Compensating coils 67 and 68 are used to compensate for misalignment of the torquer with the Y axis of the gyroscope which would result in the application of an undesired torquing component about the X axis with current flow in coils 60 and 61 (in addition to the production of the desired torque about the Y axis). This unwanted torque is compensated for by providing a current flow in coils 67 and 68 which is such as to produce an equal and opposite rotor torque about the X axis to that undesired component produced by coils 60 and 61.

To assure such compensation under all operating conditions, this compensating torquing current must be a fixed proportion of the total current flowing in main torquing coils 60 and 61. It is to be noted that if the torquing current source output were constant at all times that a fixed compensating current for coils 67 and 68 could be obtained from a separate current source. With the torquing current varying, however, as a function of latitude and vehicle speed and direction, the compensation current must be taken as a proportion of the main torquing current to achieve the desired end result.

In operative models of the device of the invention, each compensating torquing coil 67, 68, 54, and 55 has about five percent as many turns as its associated main torquing coil. The use of the compensating coils enables the relaxation of tolerances in the assembly and fabrication of the torquer by providing a precise electrical adjustment after assembly to compensate for any torquing errors due to misalignment.

Figure 4:
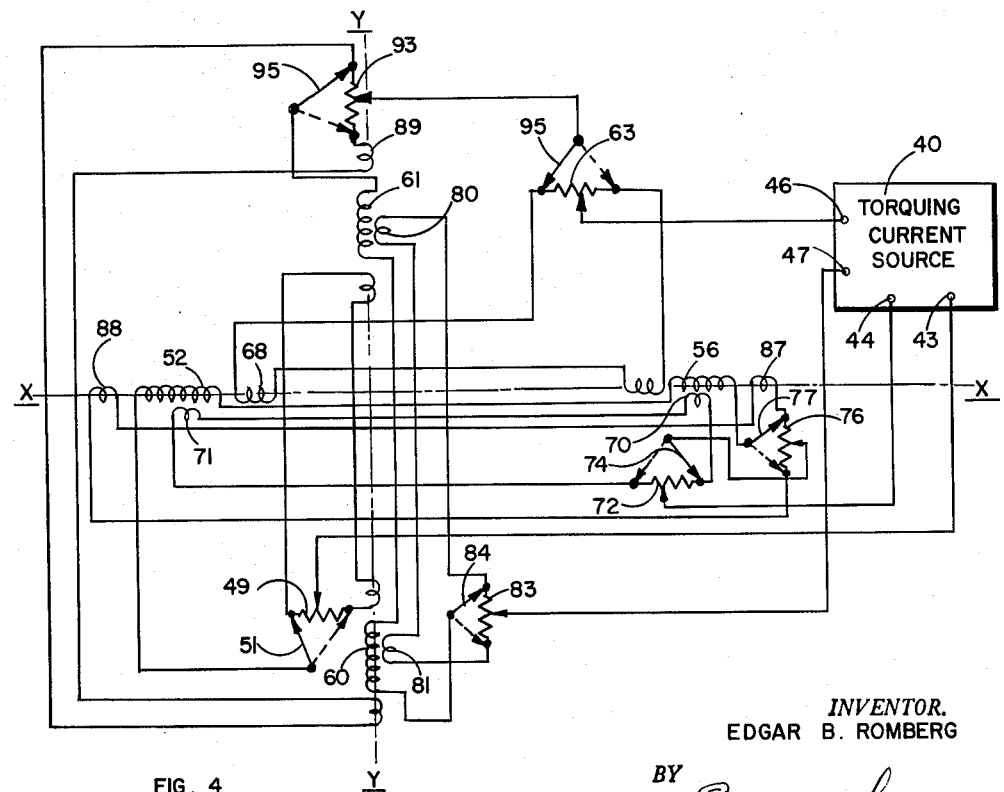
FIG. 4 is a schematic diagram of torquing compensation schemes for axis alignment, scale factor adjustment, and linearity adjustment.

Referring to FIG. 4, a schematic diagram is shown illustrating scale factor compensation and linearity compensation in addition to the alignment compensation illustrated in FIG. 3.

It is desirable to adjust the scale factor of the main torquing coils so that a given amount of current flow through these coils will produce a desired amount of torquing of the rotor. This adjustment can be accomplished by adding a pair of compensating coils for both the X and Y axes. These compensating coils should each be positioned adjacent a respective one of the main torquing coils. The scale factor compensation coils for the X axis torquing are connected so that a proportion of the total torquing current flowing to the X axis main torquing coils will flow through these compensating coils. Means are provided for adjusting the proportion of the total torquing current which will flow through these coils.

As shown in FIG. 4, the scale factor compensation coils 70 and 71 for the X axis are shown connected between the ends of scale factor adjustment potentiometer 72. The torquing current for the X axis torquing coils 52 and 56 are fed from terminal 44 to the arm of potentiometer 72. With switch 74 in the position indicated, part of this current will flow through the right-hand portion of the potentiometer through switch 74 and on to the arm of potentiometer 76. The rest of the torquing current will flow from the arm of potentiometer 72 to the left-hand portion of this potentiometer through the scale factor compensating coils 71 and 70 to switch 74 and thence to the arm of potentiometer 76. The ratio of the currents which flow through these two paths is determined by the position of the arm of potentiometer 72, more current flowing through the path including the scale factor compensating windings 70 and 71 when the arm is further to the left and more current flowing directly to the arm through the right-hand portion of the potentiometer when the potentiometer arm is more to the right.

The direction of current flow through compensating windings 71 and 70 can be reversed by throwing switch 74 to the position indicated by the dotted line. Thus the current flow through windings 70 and 71 can be adjusted both as to magnitude and direction. As coils 70 and 71 are in series with the current path to the main torquing coils 52 and 56, the current flow through these coils will always be a predetermined proportion of the total current flowing through the main torquing coils 52 and 56.

The scale factor compensating coils 80 and 81 for the Y axis are connected in series with Y axis torquing coils 60 and 61 and terminal 47 of torquing current source 40. The magnitude of the current through coils 80 and 81 can be adjusted by means of potentiometer 83 and the direction of the current flow through these coils can be reversed by throwing switch 84 from the position indicated to the position indicated by the dotted line.

The current to scale factor compensating coils 70 and 71 and 80 and 81 can thus be adjusted to either aid or buck the current flowing through their respective associated main torquing coils by a predetermined amount. As the current flowing through the scale factor compensating coils is always a proportion of the current flowing through the main torquing coils, the amount of effective torquing produced per unit of current flow through the main torquing coils can thus be adjusted by means of potentiometers 72 and 83 and switches 74 and 84.

Compensating coils 87 and 88 are connected in the X axis torquing circuit. These coils are used for linearity compensation. Such compensation is necessary to assure that the scale factor will be the same for both positive and negative torquer inputs. Such an unequal torquing effect for a torquing current through the main torquing coils in one direction as compared with the same current in the opposite direction will occur if the flux gap between magnetic core 26 and inner pole member 33 (see FIG. 2) is not equal to the flux gap between magnetic core 27 and this inner pole member. It is difficult to maintain these flux gaps identical in assembly of the gyro. Linearity compensation coils 87 and 88 should be wound so that for each direction of current flow through these coils one produces a torque which will aid that produced by its associated main torquing coil, while the other produces a torque which will buck that produced by its associated main torquing coil. The magnitude and direction of current flow through these coils is adjusted by means of potentiometer 76 and switch 77 so as to equalize the magnitude of the torquing effect of a particular magnitude of current flowing through the main torquing coils 52 and 56 in both directions.

Similar linearity compensation is provided for the Y axis torquing coils 60 and 61 by means of compensating coils 89 and 90, the current through these coils being controlled by means of potentiometer 93 and switch 95.

The device of this invention thus provides a simple yet effective means for torquer compensation. In an operative model of the device of the invention separate sets of compensating coils, each having approximately five percent of the windings of its associated main torquing coil, are utilized to achieve each type of compensation.

Referring to FIG. 5, means for compensating for misalignment of the motor torque axis is shown. With normal manufacturing tolerances, it is very difficult to maintain the motor torque axis exactly coincidental or parallel with the spin axis and a component of motor torque will exist about a transfer axis. This results in gyro drift. Further, the magnitudes of these transfer torques and associated drifts change with motor voltage and temperature.

In FIG. 5, a two-phase four-pole motor is illustrated with a first current phase being supplied between terminals 115 and 116 and a second current phase being supplied between terminals 117 and 118. Windings 96a, 96b and 97a, 97b provide the four poles of the first phase while windings 93a, 93b and 94a, 94b provide the four poles of the second phase. Compensating coils 99 and 100 are wound around opposite portions of the stator on a first axis normal to the motor spin axis while compensating coils 102 and 103 are wound adjacent the stator windings on opposite sides of the stator on an axis mutually perpendicular to this first axis and the motor spin axis. In the normal operation of the motor, a voltage is induced in each of the four compensating coils. These voltages would have no effect on the motor without a load connected across the compensating coils to permit current flow therein. Such a load is provided by variable resistor 106 and variable capacitor 107 for compensating coils 99 and 100 and by variable resistor 109 and variable capacitor 110 for compensating coils 102 and 103.

The load comprising variable resistor 106 and variable capacitor 107 can either be connected across compensating coil 99 or compensating coil 100 by means of switch 112 while the load comprising variable resistor 109 and variable capacitor 110 can alternatively be connected to compensating coil 102 or compensating coil 103 by means of switch 114. The magnitude of the load and its effective reactance can be varied by means of variable resistors 106 and 109 and variable capacitors 107 and 110. Instead of using variable capacitors and resistors, the values of resistance and capacitance necessary to compensate each particular gyroscope motor may be determined by experimentation and the necessary fixed resistors and capacitors permanently installed.

The additional current added to one sector of the motor by virtue of the compensating coils acting in conjunction with their respective loads unbalance or warps the normally uniformly rotating magnetic field thereby causing the effective electrical center of the motor to be shifted to one side or the other. The amount of this shift can be made equal and opposite to the original mechanical misorientation by the proper choice of load for the appropriate compensating coil or coils. The embodiment of FIG. 5 thus provides a simple yet effective way for compensating for motor misalignment.

The device of this invention thus provides a simple yet effective means for enabling the precise alignment of the torquer and motor in an assembled free-rotor gyroscope This permits the relaxation of manufacturing tolerances without sacrificing precision operation. In addition the device of this invention enables the precise setting of scale factor and the adjustment of linearity after assembly of the gyroscope.

While the invention has been described and illustrated in detail, it is to be clearly understood that the same is by way of illustration and example only and is not to be taken by way of limitation, the spirit and scope of this invention being limited only by the terms of the appended claims.

I claim:

1. In a gyroscope having a rotor with a conductive shell attached thereto; means for torquing said shell comprising a first pair of main windings positioned on opposite sides of said shell along a first axis normal to the rotor spin axis, a second pair of main windings positioned on opposite sides of said shell along a second axis normal to the rotor spin axis, said second axis being normal to said first axis, and a current source coupled to said main windings; and means for compensating the torques generated in said main windings comprising first and second pairs of compensating windings positioned adjacent said first and second pairs of main windings respectively, and means for causing a compensating current flow of a fixed proportion of the current flow in a respective one of said main windings in each of said compensating windings.

2. The device as recited in claim 1 wherein said means for causing compensating current flows comprises a separate potentiometer connected between said current source and each of said main windings, each pair of said compensating windings being connected in series between the ends of a respective one of said potentiometers.

3. The device as recited in claim 1 wherein said first pair of compensating windings is connected between said current source and said second pair of main windings and said second pair of compensating windings is connected between said current source and said first pair of main windings.

4. In a gyroscope having a rotor with a conductive shell attached thereto; means for torquing said shell comprising a first pair of main windings positioned on opposite sides of said shell along a first axis normal to the rotor spin axis, a second pair of main windings positioned on opposite sides of said shell along a second axis normal to the rotor spin axis, said second axis being normal to said first axis, and a current source having separate outputs coupled to each of said pairs of windings; and means for compensating the torques generated by said main windings comprising first and second pairs of compensating windings positioned adjacent said first and second pairs of main windings respectively, first and second potentiometers, each of said pairs of compensating windings being connected in series between the ends of a separate one of said potentiometers, the movable arms of said potentiometers being connected to a separate one of said current source outputs, one of the ends of each of said potentiometers being connected to a respective one of said main windings.

5. The device as recited in claim 4 and additionally comprising means for alternatively connecting each of said main windings to either end of the associated potentiometer.

6. In a gyroscope, an eddy current torquer comprising a conductive shell fixedly attached to said gyroscope rotor, two pairs of main torquing coils, said individual pairs of main torquing coils being positioned along separate axes perpendicular to the gyroscope spin axis and mutually perpendicular to each other, each of said main coils being located on a side of said shell opposite its respective paired coil, a source of torquing current having at least two outputs, and two pairs of compensating coils, each of said pairs of compensating coils being positioned opposite each other in proximity to one of said pairs of main coils, one of said pairs of main coils and one of said pairs of compensating coils being connected in series circuit with each other, the other of said pairs of main coils and the other of said pairs of compensating coils being connected in series circuit with each other, each of said series circuits being connected to a separate output of said torquing current source.

7. The device as recited in claim 6 and additionally comprising separate means for adjusting the current flow through each of said pairs of compensating coils to a fixed proportion of the current flow through their associated series connected main coils, said current adjusting means comprising a potentiometer having its ends connected across one of said pairs of series connected compensating coils, the arms of each of said potentiometers being connected to one of said separate torquing current source outputs.

8. The device as recited in claim 7 and additionally comprising means for separately reversing the current flow through each of said pairs of compensating coils without reversing the current flow through said main torquing coils.

9. A torquer for a gyroscope having a free rotor comprising a conductive shell fixedly attached to the gyroscope rotor, a first pair of main torquer coils fixedly attached to the gyroscope case, said first pair of main coils being positioned on opposite sides of said conductive shell along an axis normal to the rotor spin axis, a second pair of main torquer coils fixedly attached to the gyroscope case, said second pair of coils being positioned on opposite sides of said conductive shell along an axis normal to both the rotor spin axis and the axis along which said first pair of coils is positioned, a source of torquing current having two pairs of output terminals, a first pair of compensating torquing coils positioned opposite each other, each of said compensating coils being adjacent a respective one of said oppositely positioned first pair of main coils, and a second pair of compensating torquing coils positioned opposite each other, each coil of said second pair of compensating coils being adjacent a respective one of said oppositely positioned second pair of main coils, said first pair of main coils and one of said pairs of compensating coils being connected in series circuit between one of the pairs of output terminals of said torquing current source, said second pair of main torquing coils and the other of said pairs of compensating coils being connected in series circuit between the other of the pairs of output terminals of said torquing current source.

10. The device as recited in claim 9 and additionally comprising a plurality of pairs of compensating coils positioned adjacent to and connected in series circuit with said first pair of compensating coils and a plurality of pairs of compensating coils positioned adjacent to and connected in series circuit with said second pair of compensating coils.

11. The device as recited in claim 9 and additionally comprising means for adjusting the magnitude and direction of current flow through each of said pairs of compensating coils.

12. The device as recited in claim 11 wherein said means for adjusting the magnitude and direction of current flow through said compensating coils comprises a separate potentiometer and a separate switch for each said pair of compensating coils, each of the series connected compensating coils being connected between the ends of a respective one of said potentiometers, each of said switches being adapted to alternatively connect one of said pairs of main torquing coils to one or the other ends of one of said potentiometers, the movable arm of each of said potentiometers being connected to a separate one of the output terminals of said torquing current source.

References Cited by the Examiner
UNITED STATES PATENTS

| | | | |
|---|---|---|---|
| 2,417,689 | 3/1947 | Johnson | 74—5 |
| 2,916,919 | 12/1959 | Echolds | 74—6.46 |

BROUGHTON G. DURHAM, *Primary Examiner.*

ARTHUR M. HORTON, SAMUEL BOYD, *Examiners.*

R. F. STAHL, *Assistant Examiner.*